United States Patent
Peng et al.

(10) Patent No.: US 11,588,373 B2
(45) Date of Patent: Feb. 21, 2023

(54) KINETIC ENERGY RECOVERY SYSTEM WITH FLYWHEEL

(71) Applicant: INDUSTRIAL TECHNOLOGY RESEARCH INSTITUTE, Hsin-Chu (TW)

(72) Inventors: Ming-Tsan Peng, Jhongli (TW); Chia-Lin Wu, Kaohsiung (TW); Huan-Lung Gu, Hualien (TW); Chih-Wei Yeh, Taipei (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 255 days.

(21) Appl. No.: 16/926,950

(22) Filed: Jul. 13, 2020

(65) Prior Publication Data
US 2021/0021172 A1    Jan. 21, 2021

(30) Foreign Application Priority Data

Jul. 15, 2019 (TW) ................................. 108124834
Jun. 18, 2020 (TW) ................................. 109120561

(51) Int. Cl.
*H02K 7/02* (2006.01)
*H02J 3/30* (2006.01)
(Continued)

(52) U.S. Cl.
CPC ................. *H02K 7/025* (2013.01); *H02J 3/30* (2013.01); *H02J 7/34* (2013.01); *H02P 25/30* (2013.01); *H02P 27/06* (2013.01); *H02P 27/08* (2013.01)

(58) Field of Classification Search
CPC ...... H02J 1/16; H02J 15/00; H02J 5/00; H02J 9/066; H02J 3/30; H02J 7/34; H02P 25/30; H02P 27/06; H03K 3/00; H02M 7/98
See application file for complete search history.

(56) References Cited

U.S. PATENT DOCUMENTS 7,071,581 B2   7/2006   Eisenhaure et al.
9,837,996 B2   12/2017  Kuznetsov
(Continued)

FOREIGN PATENT DOCUMENTS

CN   201041944 Y   3/2008
CN   201742285 U   2/2011
(Continued)

OTHER PUBLICATIONS

Liwen Pan et al., An Integrated Multifunctional Bidirectional AC/DC and DC/DC Converter for Electric Vehicles Applications, Energies 2016, 9, 493.
(Continued)

*Primary Examiner* — Said Bouziane
(74) *Attorney, Agent, or Firm* — Locke Lord LLP; Tim Tingkang Xia, Esq.

(57) ABSTRACT

A kinetic energy recovery system with flywheel includes a cascade flywheel doubly-fed electric machine and an electric motor. The cascade flywheel doubly-fed electric machine has a stator end coil, a rotor end coil and a flywheel. The flywheel can store kinetic energy by increasing speed or releasing kinetic energy by decreasing speed. A control circuit has an inverter, a rectifier and a DC bus connecting the inverter and the rectifier. The inverter supplies alternating current to the rotor end coil. The rectifier has an AC end connected to the stator end coil through an AC bus. The rectifier converts alternating current to direct current, so that the inverter can draw power from the DC bus. The electric (Continued)

motor has a phase coil connected to the AC bus. When the cascade flywheel double-fed electric machine decelerates, the system converts mechanical energy into electrical energy.

8 Claims, 14 Drawing Sheets

(51) Int. Cl.
| | | |
|---|---|---|
| *H02J 7/34* | (2006.01) | |
| *H02P 27/08* | (2006.01) | |
| *H02P 25/30* | (2006.01) | |
| *H02P 27/06* | (2006.01) | |

(56) References Cited

U.S. PATENT DOCUMENTS

| 10,008,857 | B2 | 6/2018 | Kolhatkar et al. | |
|---|---|---|---|---|
| 10,224,829 | B2 | 3/2019 | Permuy | |
| 2016/0336928 | A1 | 11/2016 | Kuznetsov | |
| 2020/0395784 | A1* | 12/2020 | Kuznetsov | H02K 41/025 |

FOREIGN PATENT DOCUMENTS

| CN | 102111062 A | 6/2011 |
|---|---|---|
| CN | 201869080 U | 6/2011 |
| CN | 202115349 U | 1/2012 |
| CN | 102957159 A | 3/2013 |
| CN | 105871212 A | 8/2016 |
| CN | 104579060 B | 10/2017 |
| CN | 107681684 A | 2/2018 |
| CN | 108988380 A | 12/2018 |
| GB | 430008 A | 6/1935 |
| TW | 463187 B | 11/2001 |
| TW | 201126866 A | 8/2011 |
| TW | I453339 B | 9/2014 |

OTHER PUBLICATIONS

Juan De Santiago Ochoa, FEM Analysis Applied to Electric Machines for Electric Vehicles, Digital Comprehensive Summaries of Uppsala Dissertations from the Faculty of Science and Technology, 2011.

Anunay Gupta et al., A Review of Degradation Behavior and Modeling of Capacitors, Presented at the American Society of Mechanical Engineers (ASME) 2018, International Technical Conference and Exhibition on Packaging and Integration of Electronic and Photonic Microsystems (InterPACK 2018) San Francisco, California, 2018.

Marguerite Touma-Holmberg et al., Double Winding, High-Voltage Cable Wound Generator: Steady-State and Fault Analysis, IEEE Transactions on Energy Conversion, vol. 19, No. 2, Jun. 2004.

D. W. Swett et al., Flywheel Charging Module for Energy Storage Used in Electromagnetic Aircraft Launch System, IEEE Transactions on Magnetics, vol. 41, No. 1, 2005.

Anders Carlsson, The back to back converter control and design, Published by: Department of Industrial Electrical Engineering and Automation Lund Institute of Technology, 1998.

Taiwan Patent Office, "Office Action", dated Sep. 19, 2019, Taiwan.

* cited by examiner

KINETIC ENERGY RECOVERY SYSTEM WITH FLYWHEEL

CROSS REFERENCE TO RELATED APPLICATION

The application is based on, and claims priority from, Taiwan Application Serial Number 108124834, filed on Jul. 15, 2019, and Serial Number 109120561, filed on Jun. 18, 2020, the disclosures of which are hereby incorporated by reference herein in its entirety.

TECHNICAL FIELD

The invention relates to an energy transfer system with an energy storage flywheel, in particular to a kinetic energy recovery system with flywheel.

BACKGROUND

FIG. 1 is a schematic diagram of the architecture of a conventional energy transfer system of a flywheel and a vehicle drive motor. An energy transfer system 1 includes a flywheel module 2, drive circuit 4 and a vehicle drive motor 6.

When the energy transfer between the flywheel 2 and the drive motor 6 is to be performed, all of the energy is passed through the drive circuit 4, so that the power devices, the DC capacitors and the battery of the drive circuit 4 are subjected to considerable electrical loads.

In order to solve the above-mentioned problems, an energy transfer system with an energy storage flywheel is required. This system can increase the energy recoverable by the brakes of the drive motor, and the energy does not have to pass through all of the power electronics and DC capacitors or batteries, so that the power electronics and DC capacitors or batteries do not need to withstand all the power and cause losses.

SUMMARY

An objective of the present invention is to provide a kinetic energy recovery system for providing an energy transfer path using a flywheel electric machine and a phase coil of the drive motor to be directly connected in series, thus increasing the energy recoverable by the brake of the drive motor. And, the energy does not have to pass through all of the power electronics and DC capacitors or batteries, so that the power electronics and the DC capacitors or the batteries do not need to withstand all the power and cause losses.

The present invention achieves the above-indicated objective by providing a kinetic energy recovery system with flywheel. The kinetic energy recovery system with flywheel includes a cascade flywheel doubly-fed electric machine, an electric motor and a control circuit. The cascade flywheel doubly-fed electric machine has a stator end coil, a rotor end coil and a flywheel. The flywheel can store kinetic energy by increasing speed or releasing kinetic energy by decreasing speed. The control circuit has an inverter, a rectifier and a DC bus connecting the inverter and the rectifier. The inverter is used to supply alternating current to the rotor end coil. The rectifier has an AC end connected to the stator end coil through an AC bus. The rectifier converts alternating current to direct current, so that the inverter can draw power from the DC bus. The electric motor has a phase coil connected to the AC bus. When the cascaded flywheel double-fed electric machine decelerates, the kinetic energy recovery system with flywheel will convert mechanical energy into electrical energy. And the electrical energy is provided to the electric motor through the AC bus, so that the electric motor outputs rotating mechanical energy.

Compared to a conventional energy transfer system of a flywheel and a vehicle drive motor, the present invention has several advantages.
1. The main phase coil of the flywheel doubly-fed electric machine and the phase coil of the motor are directly connected in series to form a partial energy flow path, and to reduce the energy power flowing through the power electrons.
2. The power system can use power electronics of a lower power level to achieve energy transfer.
3. The flywheel doubly-fed electric machine can be used to provide or absorb the energy of the electric motor or generator to share the load on the DC bus side.

DETAILED DESCRIPTION

The present invention provides an energy transfer path by using a flywheel electric machine and a phase coil of the drive motor to be directly connected in series, thus increasing the energy recoverable by the brake of the drive motor. Since the flywheel electric machine and the phase coil of the drive motor are directly connected in series, the energy does not have to pass through all of the power electronics and DC capacitors or batteries, so that the power electronics and the DC capacitors or the batteries do not need to withstand all the power and cause losses.

Figure 1:
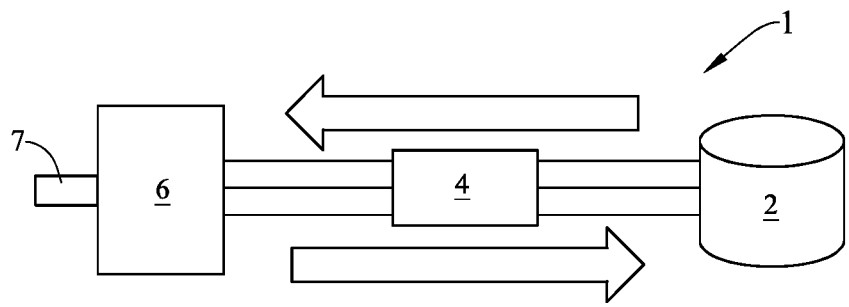
FIG. 1 is a schematic diagram of the architecture of a conventional energy transfer system of a flywheel and a vehicle drive motor.
Figure 2A:
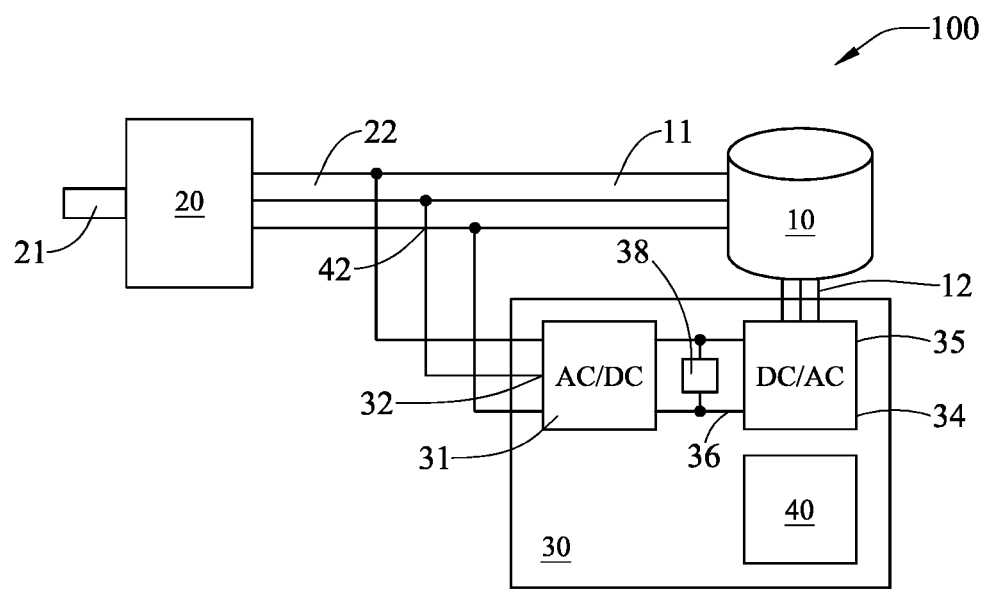
FIGS. 2A, 2B and 2C are schematic diagrams of the architecture of the kinetic energy recovery system with flywheel of the present invention.

Embodiment 1: FIG. 2A is a schematic diagram of the architecture of the kinetic energy recovery system with flywheel of the present invention. As shown in FIG. 2A, the kinetic energy recovery system with flywheel 100 includes a flywheel doubly-fed electric machine 10, an electric motor 20, a drive circuit 30 and a controller 40. The flywheel doubly-fed electric machine 10 consists of a doubly-fed electric machine and a flywheel inertia rotor. The flywheel doubly-fed electric machine 10 has a primary side coil 11 and a secondary side coil 12. The electric motor 20 has a shaft 21 and a phase coil 22. The phase coil 22 is connected in series with the primary side coil 11. The shaft 21 is used to output and input power. The electric motor 20 can be a drive motor, a linear motor or a generator applied to an electric vehicle, an automated machine or an automation industry.

The drive circuit 30 has an AC/DC circuit 31 and a DC/AC circuit 34. The AC end 32 of the AC/DC circuit 31 and the primary side coil 11 of the flywheel doubly-fed electric machine 10 are coupled to form an AC bus 42. The AC end 35 of the DC/AC circuit 34 is coupled to the secondary side coil 12 of the flywheel doubly-fed electric machine 10. A DC bus 36 and a capacitor 38 are provided between the AC/DC circuit 31 and the DC/AC circuit 34.

The controller 40 is configured to manipulate a frequency and a phase of an output voltage and an output current of the secondary side coil 12, thereby controlling the frequency and the phase of a voltage and a current output from the primary side coil 11. The controller 40 further controls the torque and speed of the electric motor 20 to recover a kinetic energy of the electric motor 20 or provide the kinetic energy to the electric motor 20. The flywheel doubly-fed electric machine 10 and the electric motor 20 can perform two-way energy transfer. A path of energy transfer is the AC bus 42 through the connection formed by the primary side coil 11 of the flywheel doubly-fed electric machine 10 and the phase coil 22 of the electric motor 20. The manipulation of the electric motor 20 is controlled by the voltage formed by the controller 40 of the drive circuit 30 on the AC bus. The manipulation strategy depends on whether the electric motor 20 is synchronous or asynchronous. Manipulating manners are implemented using existing concepts such as Direct Torque Control or Field oriented control.

The DC/AC circuit 34 coupled to the secondary side coil 12 generates a current when the AC/DC circuit 31 coupled to the primary side coil 11 maintains a DC voltage stability. The DC/AC circuit 34 coupled to the secondary side coil 12 is in an open state to make the current of the secondary side coil 12 zero when the AC/DC circuit 31 coupled to the primary side coil 11 directly drives the electric motor 20.

The embodiments can be exemplified by taking the electric motor 20 as a drive motor of an electric vehicle as an example to illustrate the two-way energy transfer of the flywheel doubly-fed electric machine 10 and the drive motor (i.e., the electric motor 20) of the electric vehicle. When the electric vehicle is decelerating, the drive motor (i.e., the electric motor 20) outputs reverse torque to recover energy and transfer the energy to the flywheel doubly-fed electric machine 10 for storage. When the electric vehicle is accelerating, the flywheel doubly-fed electric machine 10 transmits the stored energy to the drive motor (i.e., the electric motor 20) to output forward torque.

Figure 2B:
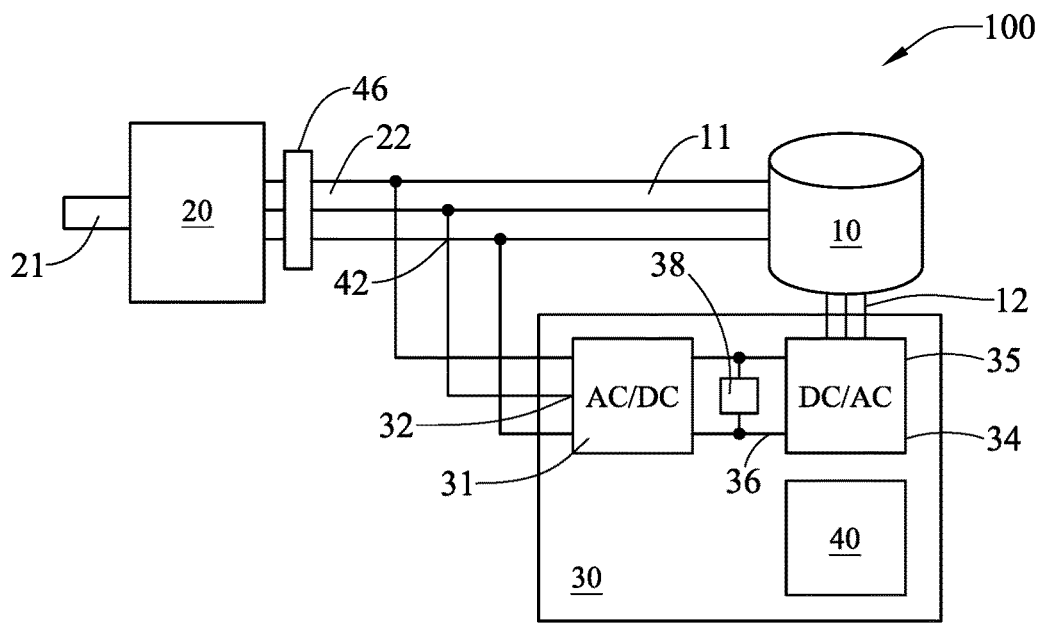

FIG. 2B shows an alternatively embodiment of the Embodiment 1 of the present invention. As shown in FIG. 2B, a connection between the primary side coil 11 of the flywheel doubly-fed electric machine 10 and the phase coil 22 of the electric motor 20 is via a multi-phase transformer 46.

Figure 2C:
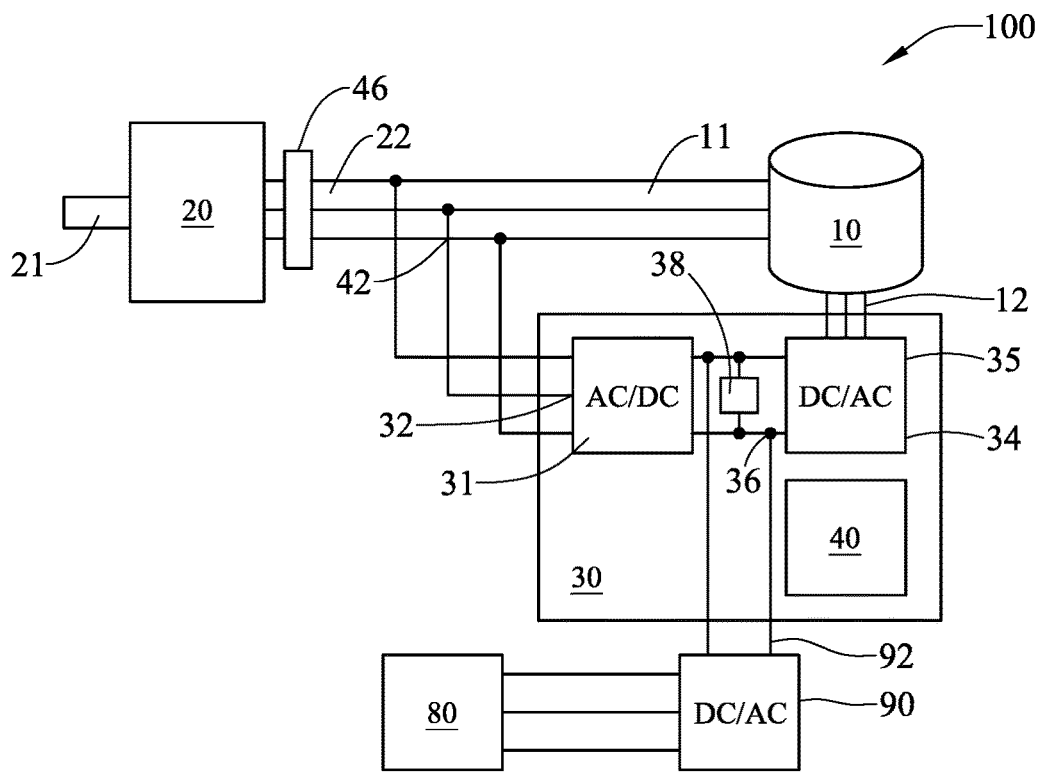

In one preferred embodiment, the kinetic energy recovery system with flywheel 100 can further be coupled to an external power grid 80 to form an uninterruptible power system for regulating the power of the power grid 80, as shown in FIG. 2C. In this architecture, the electric motor 20 becomes a generator. A DC/AC converter 90 is used to convert electrical energy from the DC bus 36 of the drive circuit 30 to three-phase power to connect to the power grid 80. A manner of coupling the kinetic energy recovery system with flywheel 100 to the power grid 80 is a series circuit 92 or a parallel transformer.

Figure 3:
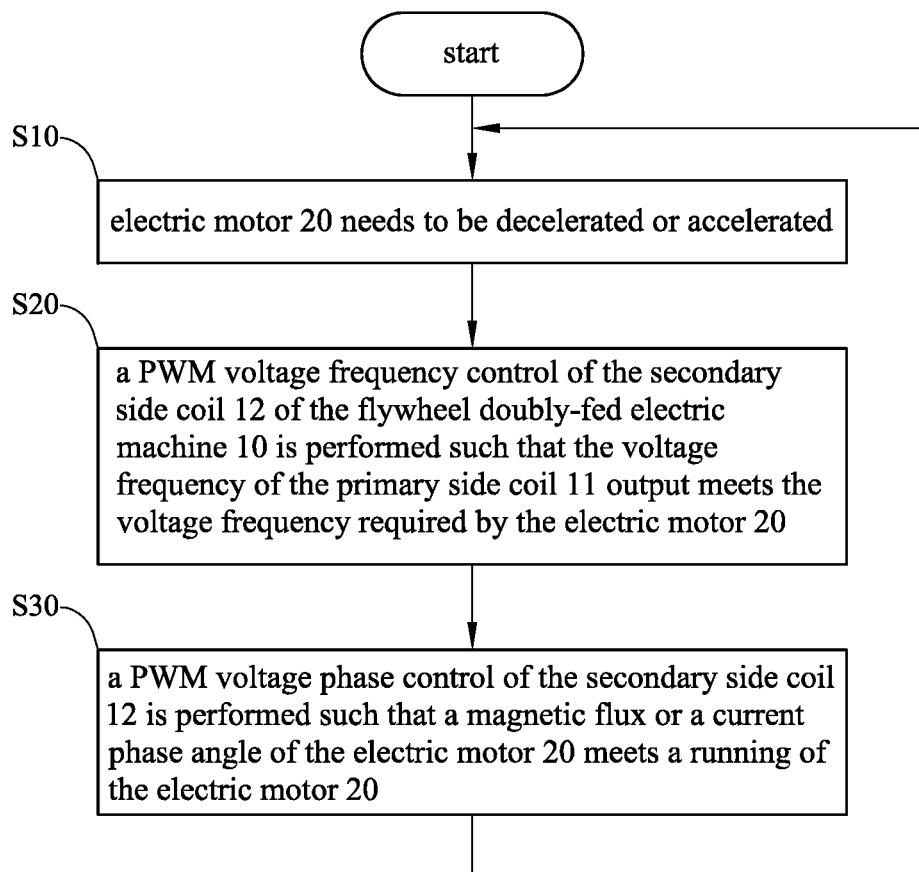
FIG. 3 is a flow chart of the manipulation method of the electric motor of the present invention.

FIG. 3 is a flow chart of the manipulation method of the electric motor of the present invention. First, the electric motor 20 needs to be decelerated or accelerated, as shown in step S10. Next, a PWM (Pulse Width Modulation) voltage frequency control of the secondary side coil 12 of the flywheel doubly-fed electric machine 10 is performed such that the output voltage frequency of the primary side coil 11 meets the voltage frequency required by the electric motor 20, as shown in step S20. Furthermore, a PWM voltage phase control of the secondary side coil 12 is performed such that a magnetic flux or a current phase angle of the electric motor 20 meets a running of the electric motor 20, as shown in step S30. The invention utilizes the manipulation of the PWM signal frequency and phase of the secondary side coil 12 of the flywheel doubly-fed electric machine 10 to make the output frequency and output phase of the primary side coil 11 meet the running requirements of the electric motor 20.

Figure 4:
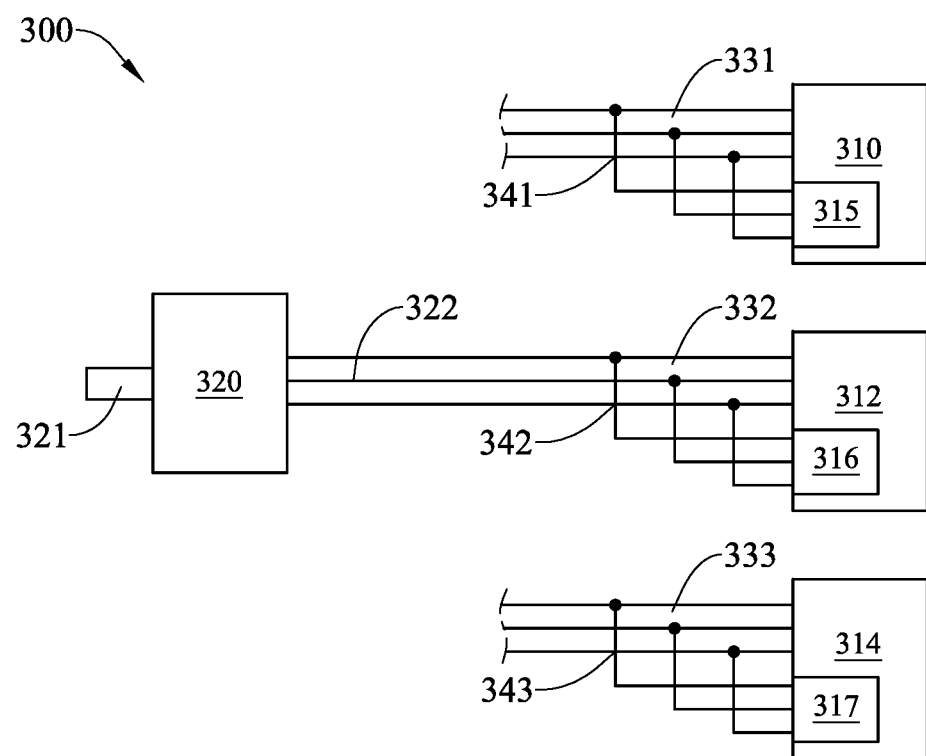
FIG. 4 is a schematic diagram of the architecture of the connection of multiple sets of flywheel doubly-fed electric machine module and one electric motor of the present invention.

Embodiment 2: FIG. 4 is a schematic diagram of the architecture of the connection of multiple sets of flywheel doubly-fed electric machine module and one electric motor of the present invention. The kinetic energy recovery system with flywheel 300 includes an electric motor 320 and a plurality of flywheel doubly-fed electric machine modules 310, 312, 314. The each flywheel doubly-fed electric machine module 310, 312, 314 has various energy storage as well as has a flywheel doubly-fed electric machine, a drive circuit, a primary side coil 331, 332, 333 and a secondary side coil, respectively. The drive circuit has an AC/DC circuit and a DC/AC circuit. The AC end of the AC/DC circuit is coupled to the primary side coils 331, 332, 333. The AC end of the DC/AC circuit is coupled to the secondary side coil. Each of the elements having the same name as in Embodiment 1 is the same and equivalent element.

The flywheel doubly-fed electric machine modules 310, 312, 314 each have a controller 315, 316, 317, respectively. The controllers 315, 316, 317 are configured to manipulate a frequency and a phase of an output voltage and an output current of the secondary side coil, thereby controlling the frequency and the phase of a voltage and a current output from the primary side coils 331, 332, 333. The controller 40 further controls the torque and speed of the electric motor 320 to recover a kinetic energy of the electric motor 320 or provide the kinetic energy to the electric motor 320.

The electric motor 320 has a shaft 321 and a phase coil 322. The phase coil 322 is connected in series with the primary side coils 331, 332, 333. Paths of energy transfer are AC bus 341, 342, 343 through the connections formed by the primary side coils 331, 332, 333 of the flywheel doubly-fed electric machine modules 310, 312, 314 and the phase coil 322 of the electric motor 320. The electric motor 320 can be a drive motor, a linear motor or a generator applied to an electric vehicle, an automated machine or an automation industry.

The kinetic energy recovery system with flywheel 300 can sequentially connect the flywheel doubly-fed electric machine modules 310, 312, 314 and the AC bus 341, 342, 343. When the flywheel doubly-fed electric machine modules 310, 312, 314 are to be used for energy storage, the flywheel doubly-fed electric machine module with the lowest energy should be added first. And, when the energy of the flywheel doubly-fed electric machine modules 310, 312, 314 are to be extracted the flywheel doubly-fed electric machine module with the highest energy should be added first. When the electric motor 320 is to extract the energy of the flywheel doubly-fed electric machine modules 310, 312, 314, the stored energies are sorted, and the flywheel doubly-fed electric machine modules with the largest stored energy to the smaller energy storage are sequentially added. When the electric motor 320 is to output energy to the flywheel doubly-fed electric machine modules 310, 312, 314, the stored energies are sorted, and the flywheel doubly-fed electric machine modules with the lowest stored energy to the larger energy storage are sequentially added.

Figure 5:
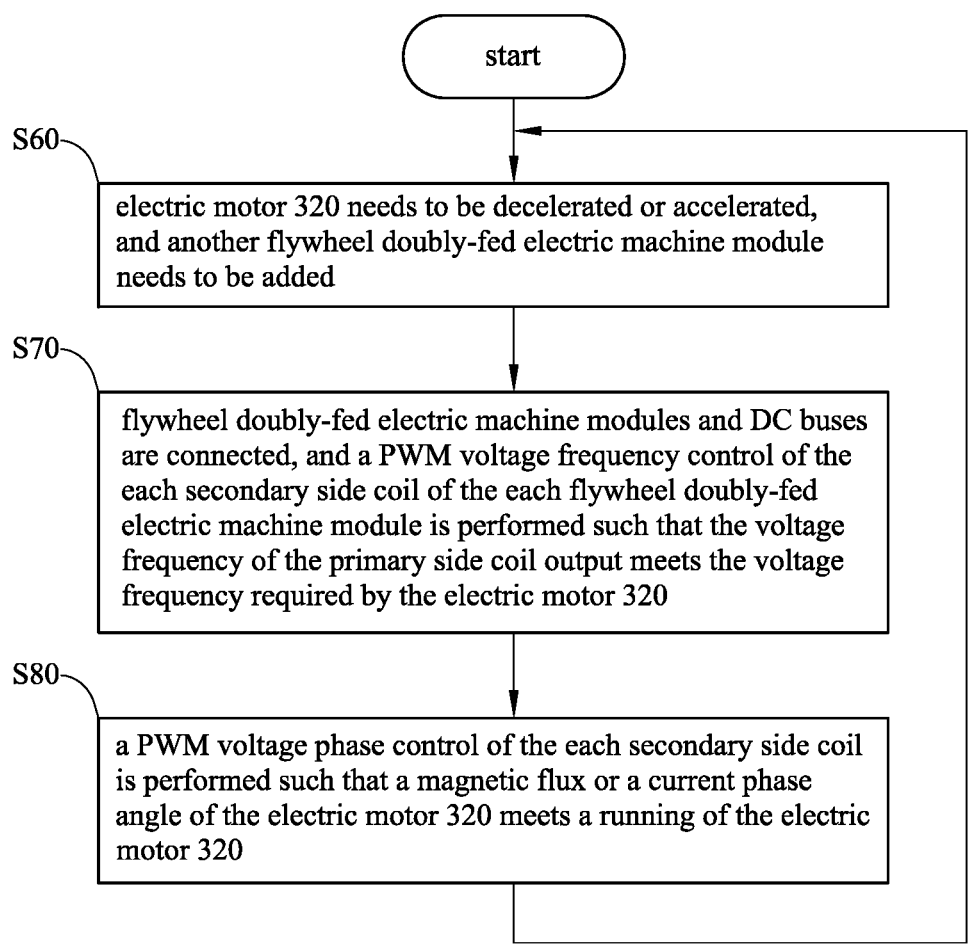
FIG. 5 is a flow chart of the manipulation method of multiple sets of flywheel doubly-fed electric machine module and one electric motor of the present invention.

FIG. 5 is a flow chart of the manipulation method of multiple sets of flywheel doubly-fed electric machine module and one electric motor of the present invention. First, the electric motor 320 needs to be decelerated or accelerated, and another flywheel doubly-fed electric machine module needs to be added, as shown in step S60. Next, flywheel doubly-fed electric machine modules and DC buses are connected, and a PWM voltage frequency control of the each secondary side coil of the each flywheel doubly-fed electric machine module is performed such that the output voltage frequency of the primary side coil meets the voltage frequency required by the electric motor 320, as shown in step S70. Furthermore, a PWM voltage phase control of the each secondary side coil is performed such that a magnetic flux or a current phase angle of the electric motor 320 meets a running of the electric motor 320, as shown in step S80.

Figure 6A:
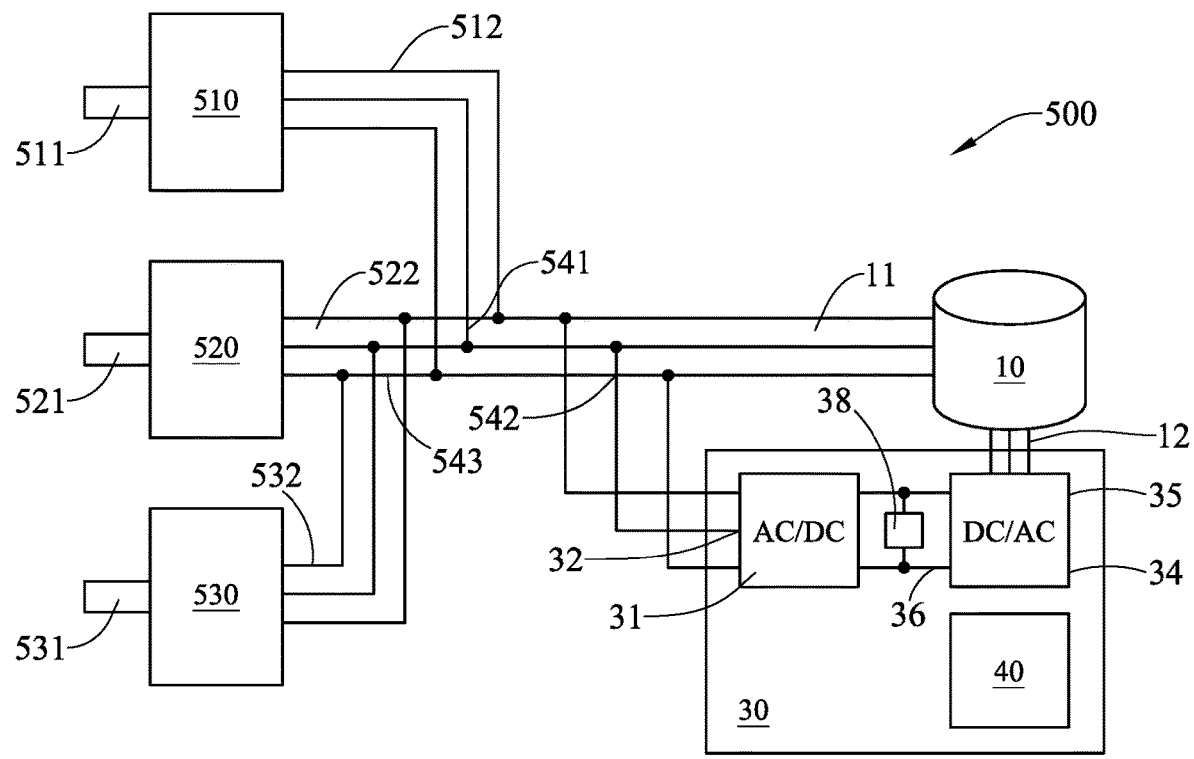
FIGS. 6A and 6B are schematic diagrams of the architecture of the connection of multiple sets of electric motor and one flywheel doubly-fed electric machine of the present invention.

Embodiment 3: FIG. 6A is a schematic diagram of the architecture of the connection of multiple sets of electric motor and one flywheel doubly-fed electric machine of the present invention. As shown in FIG. 6A, the kinetic energy recovery system with flywheel 500 includes a flywheel doubly-fed electric machine 10, a drive circuit 30, a controller 40 and electric motor 510, 520, 530. The elements, the flywheel doubly-fed electric machine 10, the drive circuit 30, the controller 40, of the kinetic energy recovery system with flywheel 500 having the same reference numerals as in Embodiment 1 are the same and equivalent elements.

The electric motors 510, 520, 530 each have a shaft 511, 521, 531 and a phase coil 512, 522, 532, respectively. The phase coil 512, 522, 532 are connected in series with the primary side coil 11. Paths of energy transfer are AC buses 541, 542, 543 through the connections formed by the primary side coil 11 of the flywheel doubly-fed electric machine 10 and the phase coil 512, 522, 532 of the electric motors 510, 520, 530. The shaft 511, 521, 531 are used to output and input power.

Figure 6B:
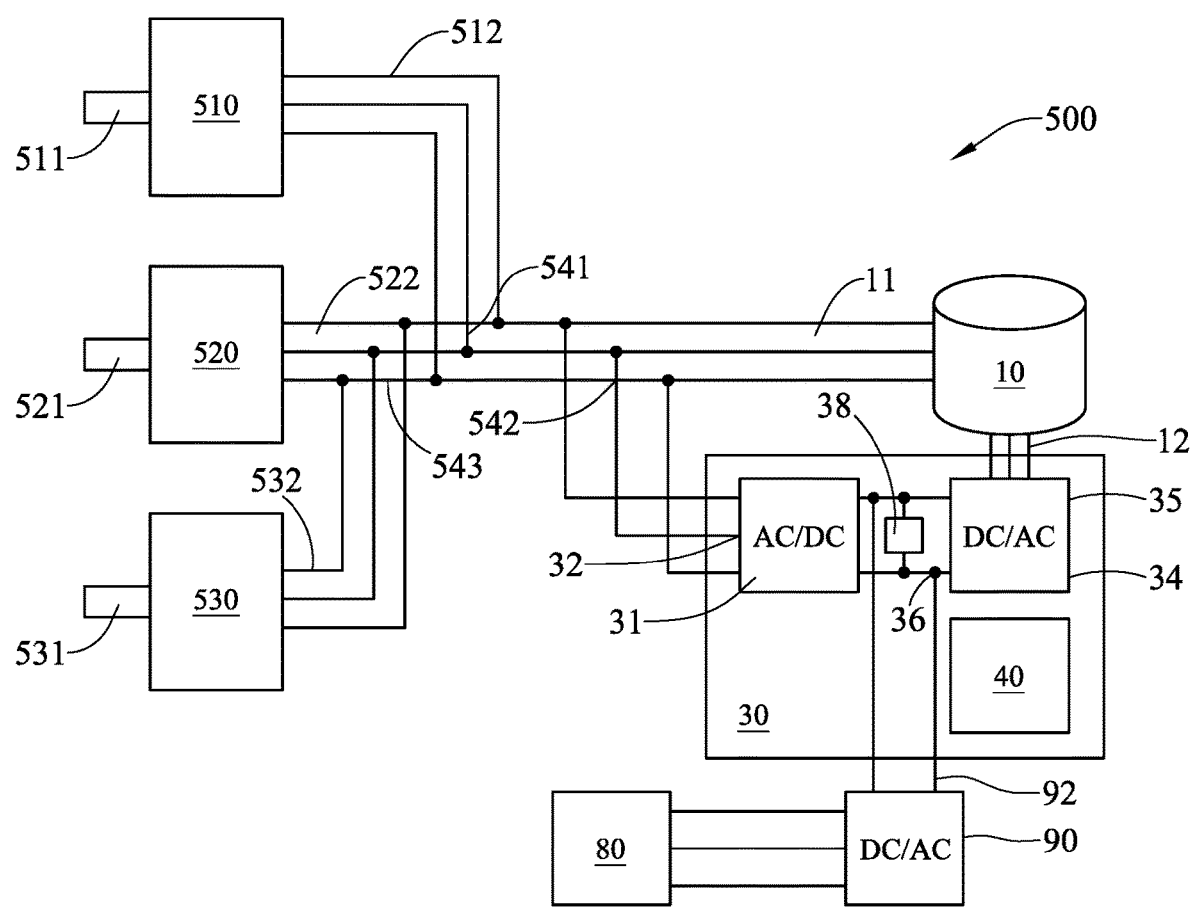

The flywheel doubly-fed electric machine 10 is controlled by the secondary side coil 12 to determine the output voltage of the primary side coil 11 when the each electric motor 510, 520, 530 is a motor. The flywheel doubly-fed electric machine 10 is controlled by the secondary side coil 12 to determine an input voltage of the primary side coil 11 when the each electric motor 510, 520, 530 is a generator. In one preferred embodiment, the kinetic energy recovery system with flywheel 500 can further be coupled to an external power grid 80 to form an uninterruptible power system for regulating the power of the power grid 80, as shown in FIG. 6B.

Figure 7:
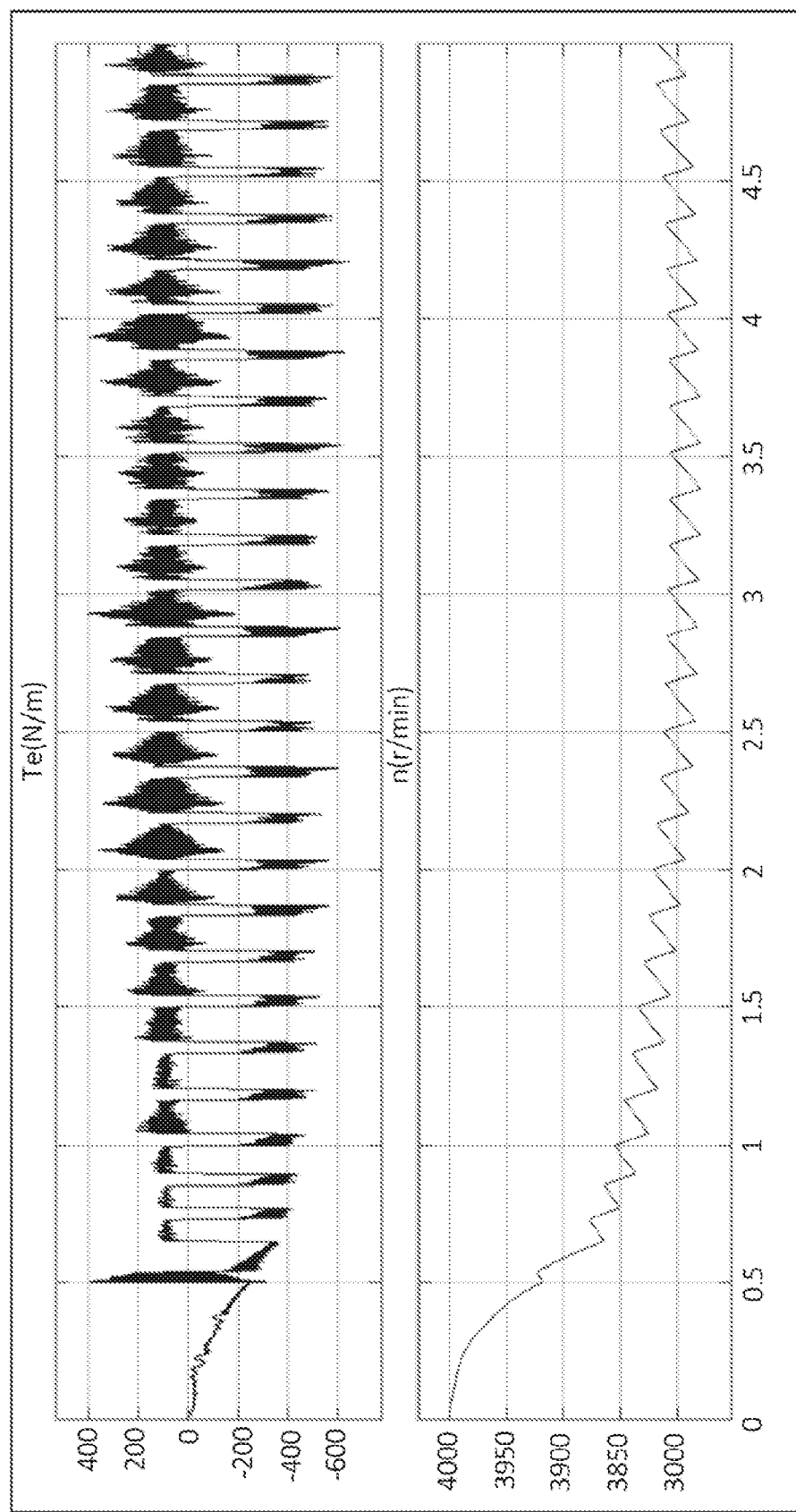
FIG. 7 shows the output energy of the flywheel versus time.
Figure 8:
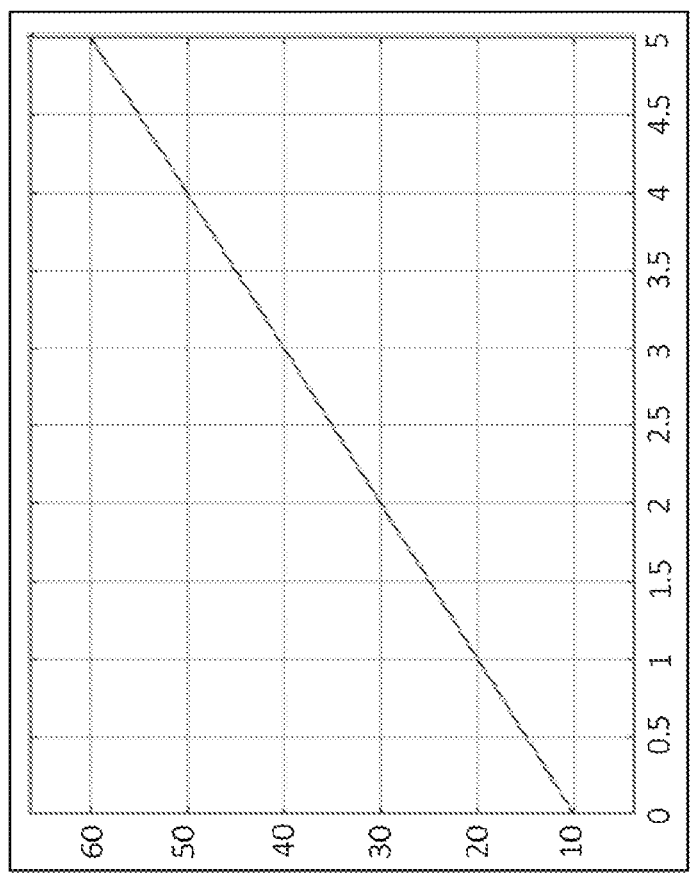
FIG. 8 shows the load torque of the electric motor versus time.
Figure 9:
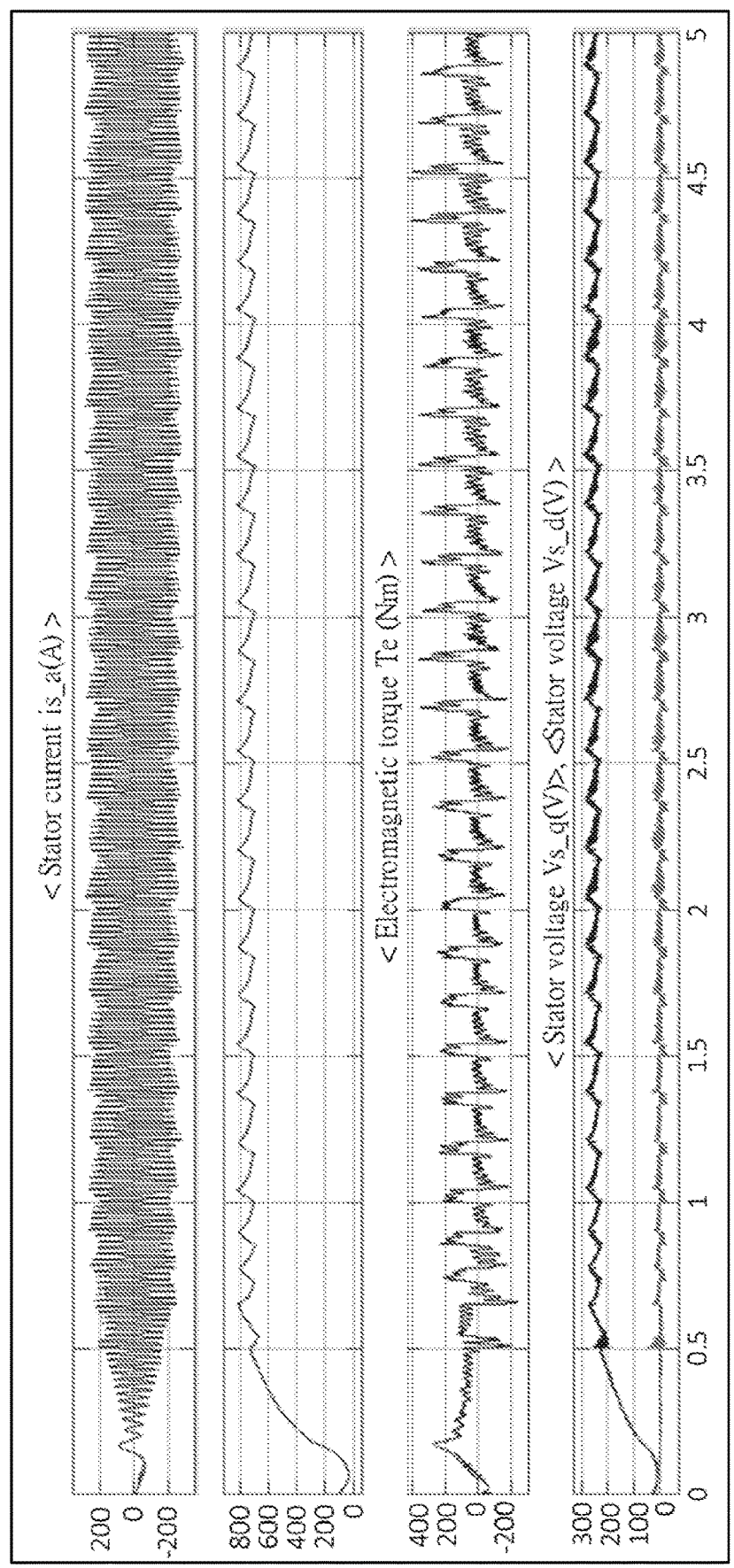
FIG. 9 shows the output energy of the electric motor versus time.

The followings are the simulation settings and illustrations of the kinetic energy recovery system with flywheel of the present invention. The flywheel doubly-fed electric machine is an energy storage flywheel, and the electric motor is a permanent magnet synchronous motor. The voltage on the primary side of the flywheel doubly-fed electric machine is synchronized with the rotor of the electric motor through the control of the secondary side. The initial speed of the flywheel is 4000 rpm, the moment of inertia is 5 kg-m2, and the stored energy is 428 kJ. FIG. 7 shows the output energy of the flywheel versus time. As shown in FIG. 7, the speed of the flywheel drops rapidly from 4000 rpm to 3800 rpm, and the energy releases about 42800 Joule. At about 2.5 seconds, the speed begins to stabilize. FIG. 8 shows the load torque of the electric motor versus time. The energy output from the flywheel is applied to the load torque of the permanent magnet synchronous motor, which is gradually increased from 10 Nm, and the load energy absorption reaches 60 Nm at 5 seconds. FIG. 9 shows the output energy of the electric motor versus time. After the flywheel transferring energy to the permanent magnet synchronous motor, the speed of the motor is increased from an initial speed of 100 rpm to 750 rpm, and the motor absorbs energy of 1514 Joule. At about 0.7 second, the speed begins to stabilize.

Figure 10:
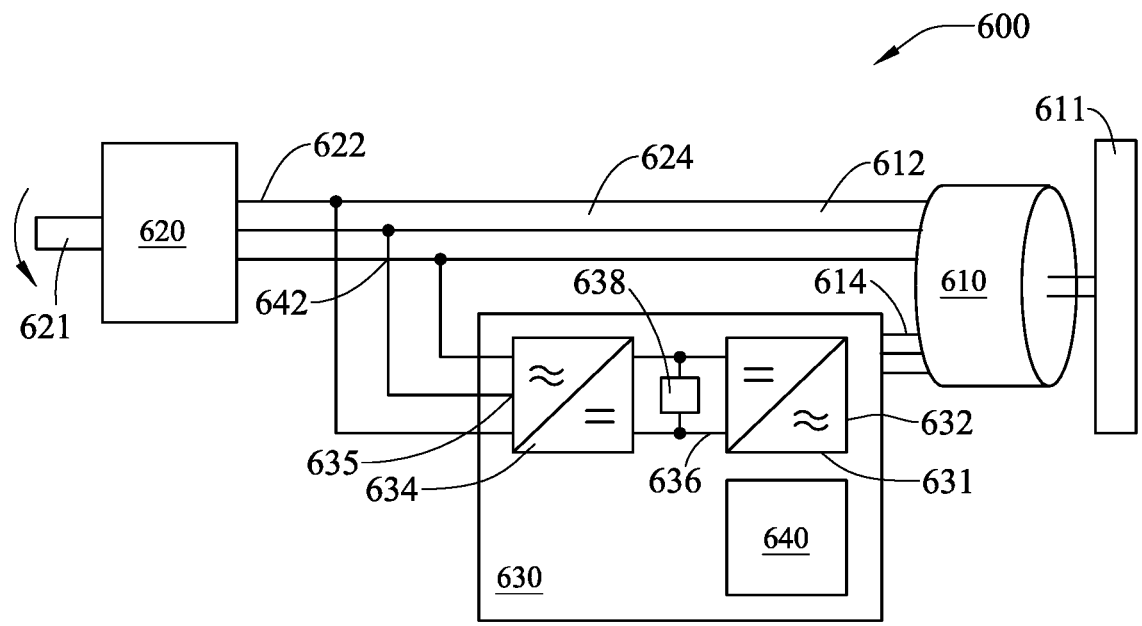
FIG. 10 is a schematic diagram of the architecture of the kinetic energy recovery system with flywheel of Embodiment 4.

Embodiment 4: FIG. 10 is a schematic diagram of the architecture of the kinetic energy recovery system with flywheel of Embodiment 4. As shown in FIG. 10, the kinetic energy recovery system with flywheel 600 includes a cascade flywheel doubly-fed electric machine 610, an electric motor 620, a control circuit 630 and a controller 640. The cascade flywheel doubly-fed electric machine 610 is composed of a doubly-fed electric machine and a flywheel inertial rotor. The flywheel inertial rotor drives a flywheel 611. The flywheel 611 can store kinetic energy by increasing the rotation speed, and the flywheel 611 can release the kinetic energy by decreasing the rotation speed.

The cascade flywheel doubly-fed electric machine 610 has a stator end coil 612 and a rotor end coil 614. The control circuit 630 has an inverter 631, a rectifier 634 and a DC bus 636 connecting the inverter 631 and the rectifier 634. The inverter 631 is used to supply alternating current to the rotor end coil 614. The rectifier 634 converts alternating current to direct current, so that the inverter 631 can draw power from the DC bus 636. The rectifier 634 has an AC end 635 connected to the stator end coil 612 of the cascade flywheel doubly-fed electric machine 610 through an AC bus 624.

The control circuit 630 has the inverter 631 and the rectifier 634, wherein the AC end 635 of the rectifier 634 and the stator end coil 612 of the cascade flywheel doubly-fed electric machine 610 are connected to form an AC bus 642. The AC end 632 of the inverter 631 is connected to the rotor end coil 614 of the flywheel doubly-fed electric machine 610. There is a DC bus 636 and a capacitor 638 between the inverter 631 and the rectifier 634.

The electric motor 620 has a transmission shaft 621 and a phase coil 622. The phase coil 622 is directly connected to the AC bus 624. The transmission shaft 621 is used to output and input power. The electric motor 620 can be a drive motor, a linear motor or a generator applied to an electric vehicle, an automated machine or an automation industry. The electric motor 620 can convert mechanical energy into electrical energy through deceleration of the cascade flywheel doubly-fed electric machine 610, and provide electrical energy to the electric motor 620 through the AC bus 624 to enable the electric motor 620 to output rotating mechanical energy. At this time, the electric motor 620 is in the motor mode. Alternatively, the electric motor 620 can be operated in the generator mode. The motor 620 can recover mechanical energy and convert it into electrical energy, which is then transferred to the stator end coil 612 of the cascade flywheel doubly-fed electric machine 610 by the AC bus 624, so that the cascade flywheel doubly-fed electric machine 610 can convert electrical energy into mechanical energy, and increase the speed of the flywheel 611 to store kinetic energy. The controller 640 is configured to manipulate a frequency and a phase of an output voltage and an output current of the rotor end coil 614, thereby controlling the frequency and the phase of a voltage and a current output from the stator end coil 612. The controller 640 further controls the torque and speed of the electric motor 620 to recover a kinetic energy of the electric motor 620 or provide the kinetic energy to the electric motor 620. The cascade flywheel doubly-fed electric machine 610 and the electric motor 620 can perform two-way energy transfer. A path of energy transfer is the AC bus 642 through the connection formed by the stator end coil 612 of the cascade flywheel doubly-fed electric machine 610 and the phase coil 622 of the electric motor 620. The manipulation of the electric motor 620 is controlled by the voltage formed by the controller 640 of the drive circuit 630 on the AC bus. The manipulation strategy depends on whether the electric motor 620 is synchronous or asynchronous. Manipulating manners are implemented using existing concepts such as Direct Torque Control or Field oriented control.

When the rectifier 634 connected to the stator end coil 612 maintains a stable DC voltage, the inverter 631 connected to the rotor end coil 614 generates current. When the rectifier 634 connected to the stator end coil 612 directly drives the electric motor 620, the inverter 631 connected to the rotor end coil 614 is in an open state, and the current at the rotor end coil 614 is zero.

Figure 11:
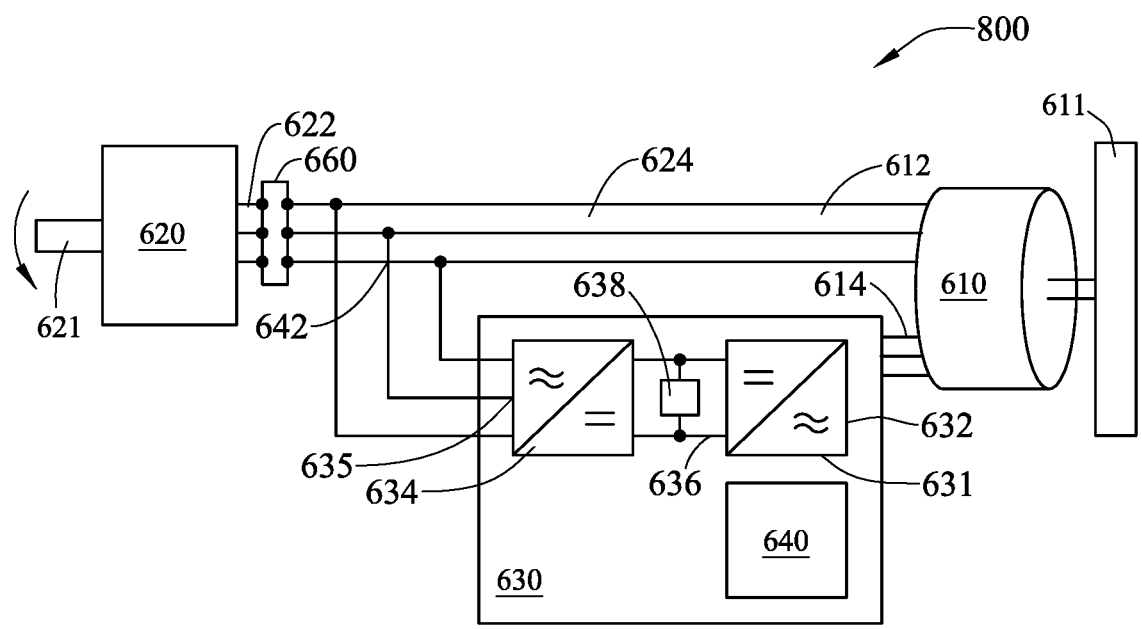
FIG. 11 is a schematic diagram of the architecture of the kinetic energy recovery system with flywheel of Embodiment 5.

Embodiment 5: FIG. 11 is a schematic diagram of the architecture of the kinetic energy recovery system with flywheel of Embodiment 5. As shown in FIG. 11, the kinetic energy recovery system with flywheel 800 includes a cascade flywheel doubly-fed electric machine 610, an electric motor 620, a control circuit 630 and a controller 640. The electric motor 620 in Embodiment 5 has a phase coil 622, and the connection of the phase coil 622 and the AC bus 624 is connected using a three-phase transformer 660.

Figure 12:
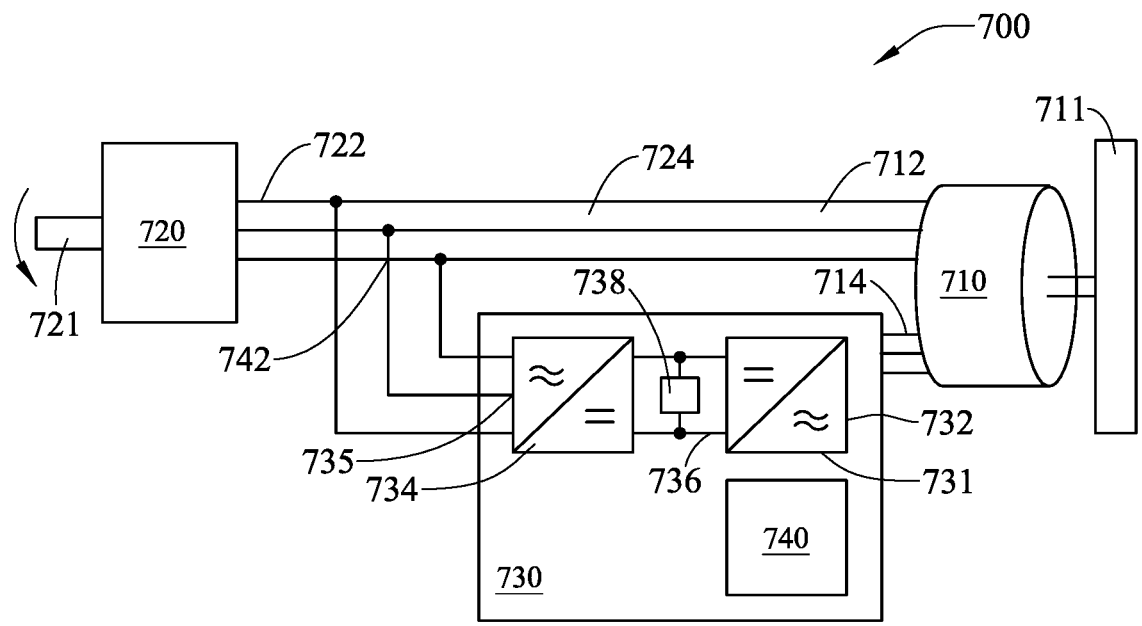
FIG. 12 is a schematic diagram of the architecture of the kinetic energy recovery system with flywheel of Embodiment 6.

Embodiment 6: FIG. 12 is a schematic diagram of the architecture of the kinetic energy recovery system with flywheel of Embodiment 6. As shown in FIG. 12, the kinetic energy recovery system with flywheel 700 includes a modulation flywheel doubly-fed electric machine 710, an electric motor 720, a control circuit 730 and a controller 740. The modulation flywheel doubly-fed electric machine 710 is composed of a doubly-fed electric machine and a flywheel inertial rotor. The flywheel inertial rotor drives a flywheel 711. The flywheel 711 can store kinetic energy by increasing the rotation speed, and the flywheel 711 can release the kinetic energy by decreasing the rotation speed.

The modulation flywheel doubly-fed electric machine 710 has a second stator end coil 712 and a third stator end coil 714. The control circuit 730 has an inverter 731, a rectifier 734 and a DC bus 736 connecting the inverter 731 and the rectifier 734. The inverter 731 is used to supply alternating current to the third stator end coil 714. The rectifier 734 converts alternating current to direct current, so that the inverter 631 can draw power from the DC bus 736. The rectifier 734 has an AC end 735 connected to the second stator end coil 712 of the modulation flywheel doubly-fed electric machine 710 through an AC bus 724.

The control circuit 730 has the inverter 731 and the rectifier 734, wherein the AC end 735 of the rectifier 734 and the second stator end coil 712 of the modulation flywheel doubly-fed electric machine 710 are connected to form an AC bus 742. The AC end 732 of the inverter 731 is connected to the third stator end coil 714 of the modulation flywheel doubly-fed electric machine 710. There is a DC bus 736 and a capacitor 738 between the inverter 731 and the rectifier 734.

The electric motor 720 has a transmission shaft 721 and a phase coil 722. The phase coil 722 is directly connected to the AC bus 724. The transmission shaft 721 is used to output and input power. The electric motor 720 can be a drive motor, a linear motor or a generator applied to an electric vehicle, an automated machine or an automation industry. The electric motor 720 can convert mechanical energy into electrical energy through deceleration of the modulation flywheel doubly-fed electric machine 710, and provide electrical energy to the electric motor 720 through the AC bus 724 to enable the electric motor 720 to output rotating mechanical energy. At this time, the electric motor 720 is in the motor mode. Alternatively, the electric motor 720 can be operated in the generator mode. The motor 720 can recover mechanical energy and convert it into electrical energy, which is then transferred to the second stator end coil 712 of the modulation flywheel doubly-fed electric machine 710 by the AC bus 724, so that the modulation flywheel doubly-fed electric machine 710 can convert electrical energy into mechanical energy, and increase the speed of the flywheel 711 to store kinetic energy.

The controller 740 is configured to manipulate a frequency and a phase of an output voltage and an output current of the third stator end coil 714, thereby controlling the frequency and the phase of a voltage and a current output from the second stator end coil 712. The controller 740 further controls the torque and speed of the electric motor 720 to recover a kinetic energy of the electric motor 720 or provide the kinetic energy to the electric motor 720. The modulation flywheel doubly-fed electric machine 710 and the electric motor 720 can perform two-way energy transfer. A path of energy transfer is the AC bus 742 through the connection formed by the second stator end coil 712 of the modulation flywheel doubly-fed electric machine 710 and the phase coil 722 of the electric motor 720. The manipulation of the electric motor 720 is controlled by the voltage formed by the controller 740 of the drive circuit 730 on the AC bus. The manipulation strategy depends on whether the electric motor 720 is synchronous or asynchronous. Manipulating manners are implemented using existing concepts such as Direct Torque Control or Field oriented control.

When the rectifier 734 connected to the second stator end coil 712 maintains a stable DC voltage, the inverter 731 connected to the third stator end coil 714 generates current. When the rectifier 734 connected to the second stator end coil 712 directly drives the electric motor 720, the inverter 731 connected to the third stator end coil 714 is in an open state, and the current at the third stator end coil 714 is zero.

Figure 13:
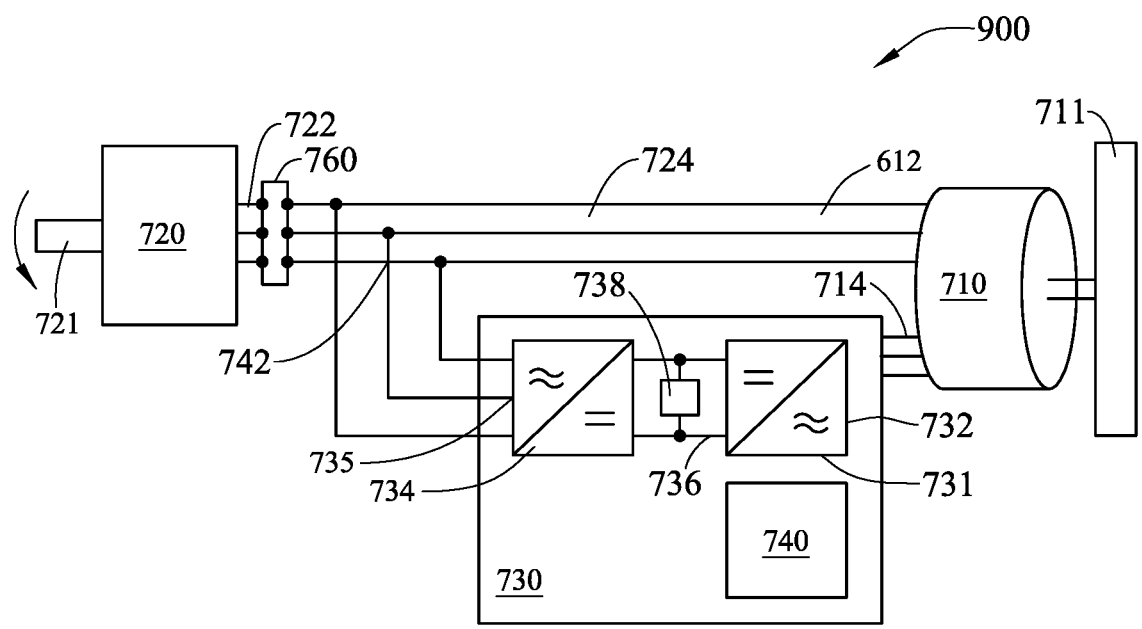
FIG. 13 is a schematic diagram of the architecture of the kinetic energy recovery system with flywheel of Embodiment 7.

Embodiment 7: FIG. 13 is a schematic diagram of the architecture of the kinetic energy recovery system with flywheel of Embodiment 7. As shown in FIG. 13, the kinetic energy recovery system with flywheel 900 includes a modulation flywheel doubly-fed electric machine 710, an electric motor 720, a control circuit 730 and a controller 740. The electric motor 720 in Embodiment 7 has a phase coil 722, and the connection of the phase coil 722 and the AC bus 724 is connected using a three-phase transformer 760.

Figure 14:
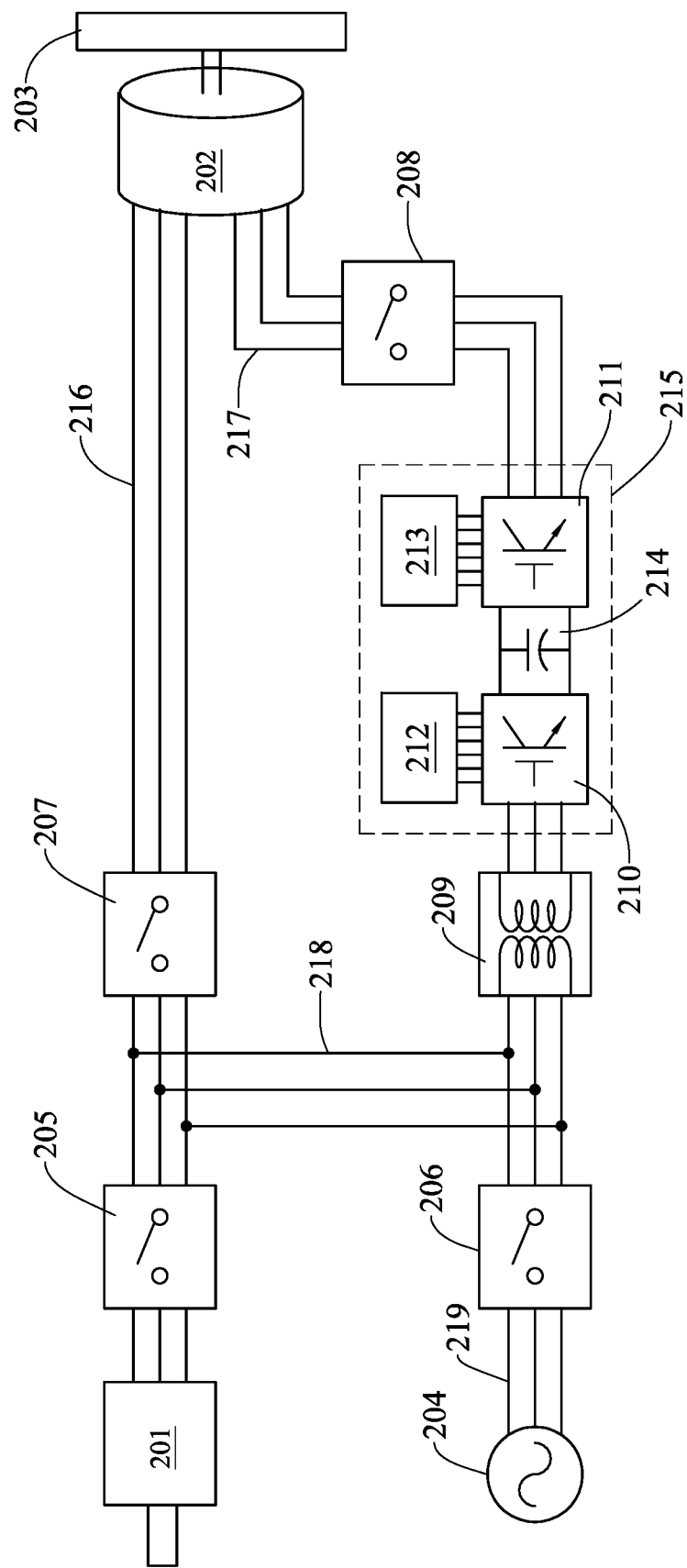
FIG. 14 is a schematic diagram of circuit hardware architecture of the kinetic energy recovery system with flywheel of Embodiment 8.

Embodiment 8: FIG. 14 is a schematic diagram of circuit hardware architecture of the kinetic energy recovery system with flywheel of Embodiment 8. As shown in FIG. 14, between an electric motor 201 and a flywheel doubly-fed electric machine 202, a three-phase AC bus 218 is connected to the double-fed electric machine stator AC bus 216, with a contactor 205 and a contactor 207 in the middle.

A power source of a system controller 215 passes from the three-phase AC bus 218 through a transformer 209, enters an inverter 210, and rectifies a DC bus 214.

A power source of the rectifier controller 212 and a drive controller 213 is the DC bus 214, and outputs PWM (Pulse Width Modulation) signals to the inverter 210 and an inverter 211, respectively.

An output of the drive controller 213 is amplified by the inverter 211, and then input to the flywheel doubly-fed electric machine 202 through a contactor 208 and the doubly-fed electric machine rotor AC bus 217.

The three-phase AC bus 218 can also be connected to a commercial power 204, and a commercial AC bus 219 is connected through a contactor 206 to receive external energy. A transformer can be installed on each AC bus of the embodiments of the present invention.

The kinetic energy recovery system with flywheel of the present invention has the following multiple energy transfer methods, including that the energy transfer method 1 is for connecting the contactor 205 and the contactor 206, so that the electric motor 201 can be directly operated by connecting to the commercial power 204. The energy transfer method 2 is to connect the contactor 206, the contactor 207, and the contactor 208, so that the flywheel doubly-fed electric machine 202 can be directly connected to the commercial power 204, and the drive controller 213 controls the rotor voltage of the flywheel doubly-fed electric machine 202 to make it run. The energy transfer method 3 is used for the energy transfer method 1 and the energy transfer method 2 at the same time. The energy transfer method 4 is to connect the contactor 206, the contactor 207, and the contactor 208, use the flywheel doubly-fed electric machine 202 as a generator, and the drive controller 213 controls the rotor voltage of the flywheel doubly-fed electric machine 202. The energy of a flywheel 203 is recharged to the three-phase AC bus 218, and output to the commercial power 204. The energy transfer method 5 is to connect the contactor 205, the contactor 207, and the contactor 208, use the flywheel doubly-fed electric machine 202 as a generator, and the drive controller 213 controls the rotor voltage of the flywheel doubly-fed electric machine 202. The energy of the flywheel 203 is recharged to the three-phase AC bus 218 and output to the electric motor 201. The energy transfer method 6 is used for the energy transfer method 4 and the energy transfer method 5 at the same time. The energy transfer method 7 is to connect the contactor 205, the contactor 207, and the contactor 208, use the electric motor 201 as a generator, and recharge the energy to the three-phase AC bus 218. The drive controller 213 controls the rotor voltage of the flywheel doubly-fed electric machine 202 to output the energy of the three-phase AC bus 218 to the flywheel doubly-fed electric machine 202 and store it in the flywheel 203.

Figure 15:
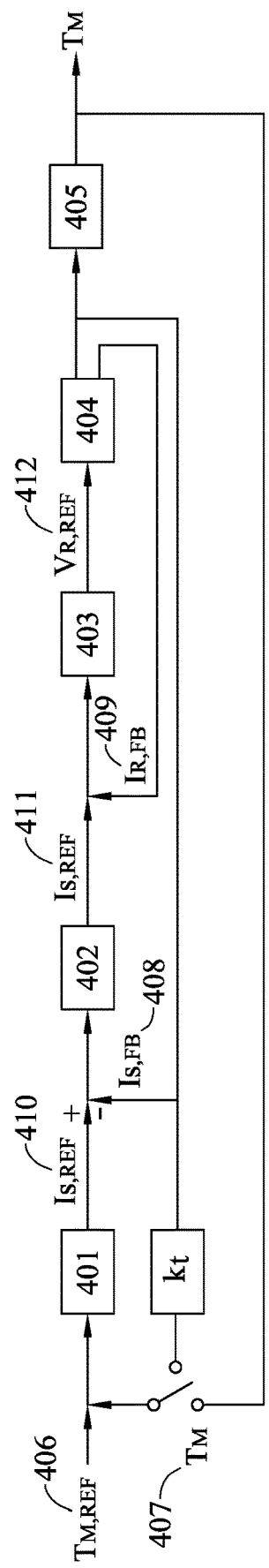
FIG. 15 is a schematic diagram of drive controller architecture of the kinetic energy recovery system with flywheel of Embodiment 9.

Embodiment 9: FIG. 15 is a schematic diagram of drive controller architecture of the kinetic energy recovery system with flywheel of Embodiment 9. As shown in FIG. 15, the system control goal is to input a rotor current 411 through the rotor of the flywheel doubly-fed electric machine 404, so that a stator current 408 is induced, and then an output torque 407 is generated in an electric motor 405. Given an electric motor torque command 406 and an electric motor output torque feedback 407, a result is input to a torque controller 401, and a stator current command 410 is generated. After the stator current command 410 and the stator current feedback 408 are calculated, a result is input to the stator current controller 402, and the rotor current command 411 is generated. After the rotor current command 411 and the rotor current feedback 409 are calculated, a result is input to the rotor current controller 403, and the rotor voltage command 412 is generated. After the rotor voltage command 412 is amplified through the drive circuit, a result is input to the rotor side of the flywheel doubly-fed electric machine 404, and a stator current 408 is induced on the stator side. The stator current 408 is input to the electric motor 405, and an output torque 407 is generated to complete the entire control loop. Torque control can also be changed to speed control, the torque controller 401, the stator current controller 402 and the rotor current controller 403 can be combined or split. The electric motor of Embodiment 9 is a motor, and the motor can be any type of motor, and the torque can be estimated by a torque meter or through the stator current.

The invention claimed is:

1. A kinetic energy recovery system with flywheel, comprising:
   a cascade flywheel doubly-fed electric machine, having a doubly-fed electric machine and a flywheel inertial rotor connected to each other, wherein the cascade flywheel doubly-fed electric machine has a stator end coil, a rotor end coil and a flywheel, and the flywheel can store kinetic energy by increasing speed or releasing kinetic energy by decreasing speed;
   a control circuit, having an inverter, a rectifier and a DC bus connecting the inverter and the rectifier, wherein the inverter is used to supply alternating current to the rotor end coil, the rectifier has an AC end connected to the stator end coil through an AC bus, and the rectifier converts alternating current to direct current, so that the inverter can draw power from the DC bus; and
   an electric motor, having a phase coil connected to the AC bus, wherein when the cascade flywheel double-fed electric machine decelerates, the cascade flywheel double-fed electric machine converts mechanical energy into electrical energy, and provides the electrical energy to the electric motor through the AC bus, so that the electric motor outputs rotating mechanical energy, wherein the electric motor can recover mechanical energy into electrical energy, which is then transferred to the stator end coil of the cascade flywheel doubly-fed electric machine by the AC bus, so that the cascade flywheel doubly-fed electric machine can convert electrical energy into mechanical energy, and increase the speed of the flywheel to store kinetic energy.

2. The kinetic energy recovery system with flywheel as recited in claim 1, wherein the electric motor can be a drive motor, a linear motor or a generator applied to an electric vehicle, an automated machine or an automation industry.

3. A kinetic energy recovery system with flywheel, comprising:

a cascade flywheel doubly-fed electric machine, having a doubly-fed electric machine and a flywheel inertial rotor connected to each other, wherein the cascade flywheel doubly-fed electric machine has a stator end coil, a rotor end coil and a flywheel, and the flywheel can store kinetic energy by increasing speed or releasing kinetic energy by decreasing speed;

a control circuit, having an inverter, a rectifier and a DC bus connecting the inverter and the rectifier, wherein the inverter is used to supply alternating current to the rotor end coil, the rectifier has an AC end connected to the stator end coil through an AC bus, and the rectifier converts alternating current to direct current, so that the inverter can draw power from the DC bus; and an electric motor, having a phase coil connected to the AC bus using a three-phase transformer, wherein when the cascade flywheel double-fed electric machine decelerates, the cascade flywheel double-fed electric machine converts mechanical energy into electrical energy, and provides the electrical energy to the electric motor through the AC bus, so that the electric motor outputs rotating mechanical energy, wherein the electric motor can recover mechanical energy into electrical energy, which is then transferred to the stator end coil of the cascade flywheel doubly-fed electric machine by the AC bus, so that the cascade flywheel doubly-fed electric machine can convert electrical energy into mechanical energy, and increase the speed of the flywheel to store kinetic energy.

4. The kinetic energy recovery system with flywheel as recited in claim 3, wherein the electric motor can be a drive motor, a linear motor or a generator applied to an electric vehicle, an automated machine or an automation industry.

5. A kinetic energy recovery system with flywheel, comprising:

a modulation flywheel doubly-fed electric machine, having a second stator end coil, a third stator end coil and a flywheel, wherein the flywheel can store kinetic energy by increasing speed or releasing kinetic energy by decreasing speed;

a control circuit, having an inverter, a rectifier and a DC bus connecting the inverter and the rectifier, wherein the inverter is used to supply alternating current to the third stator end coil, the rectifier has an AC end connected to second stator end coil through an AC bus, and the rectifier converts alternating current to direct current, so that the inverter can draw power from the DC bus; and an electric motor, having a phase coil connected to the AC bus, wherein when the modulation flywheel doubly-fed electric machine decelerates, the modulation flywheel double-fed electric machine converts mechanical energy into electrical energy, and provides the electrical energy to the electric motor through the AC bus, so that the electric motor outputs rotating mechanical energy, wherein the electric motor can recover mechanical energy into electrical energy, which is then transferred to the second stator end coil of the modulation flywheel doubly-fed electric machine by the AC bus, so that the modulation flywheel doubly-fed electric machine can convert electrical energy into mechanical energy, and increase the speed of the flywheel to store kinetic energy.

6. The kinetic energy recovery system with flywheel as recited in claim 5, wherein the electric motor can be a drive motor, a linear motor or a generator applied to an electric vehicle, an automated machine or an automation industry.

7. A kinetic energy recovery system with flywheel, comprising:

a modulation flywheel doubly-fed electric machine, having a second stator end coil, a third stator end coil and a flywheel, wherein the flywheel can store kinetic energy by increasing speed or releasing kinetic energy by decreasing speed;

a control circuit, having an inverter, a rectifier and a DC bus connecting the inverter and the rectifier, wherein the inverter is used to supply alternating current to the third stator end coil, the rectifier has an AC end connected to second stator end coil through an AC bus, and the rectifier converts alternating current to direct current, so that the inverter can draw power from the DC bus; and an electric motor, having a phase coil connected to the AC bus using a three-phase transformer, wherein when the modulation flywheel doubly-fed electric machine decelerates, the modulation flywheel double-fed electric machine converts mechanical energy into electrical energy, and provides the electrical energy to the electric motor through the AC bus, so that the electric motor outputs rotating mechanical energy, wherein the electric motor can recover mechanical energy into electrical energy, which is then transferred to the second stator end coil of the modulation flywheel doubly-fed electric machine by the AC bus, so that the modulation flywheel doubly-fed electric machine can convert electrical energy into mechanical energy, and increase the speed of the flywheel to store kinetic energy.

8. The kinetic energy recovery system with flywheel as recited in claim 7, wherein the electric motor can be a drive motor, a linear motor or a generator applied to an electric vehicle, an automated machine or an automation industry.

* * * * *